(12) United States Patent
Puri et al.

(10) Patent No.: US 9,694,826 B1
(45) Date of Patent: Jul. 4, 2017

(54) VEHICLE CONTROLS FOR DETERMINING OPTIMAL GEAR SHIFTING OPPORTUNITIES USING DYNAMICALLY DETERMINED VEHICLE PARAMETERS

(71) Applicant: Cummins In., Columbus, IN (US)

(72) Inventors: Anant Puri, Columbus, IN (US); Steven M. Bellinger, Columbus, IN (US); Vivek A. Sujan, Columbus, IN (US); Kenneth Follen, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 38 days.

(21) Appl. No.: 14/976,846

(22) Filed: Dec. 21, 2015

(51) Int. Cl.
*G06F 17/00* (2006.01)
*B60W 30/19* (2012.01)
*B60K 31/00* (2006.01)
*B60W 10/06* (2006.01)
*B60W 10/11* (2012.01)

(52) U.S. Cl.
CPC ......... *B60W 30/19* (2013.01); *B60K 31/0058* (2013.01); *B60W 10/06* (2013.01); *B60W 10/11* (2013.01); *B60W 2510/0657* (2013.01); *B60W 2510/1005* (2013.01); *B60W 2540/16* (2013.01); *B60W 2550/142* (2013.01); *B60W 2550/22* (2013.01); *B60W 2710/0644* (2013.01); *B60W 2710/1005* (2013.01)

(58) Field of Classification Search
None
See application file for complete search history.

(56) References Cited

U.S. PATENT DOCUMENTS

| | | | | |
|---|---|---|---|---|
| 5,323,667 A | * | 6/1994 | Tweed | B60W 30/18 477/107 |
| 5,389,051 A | * | 2/1995 | Hirate | F02D 31/006 477/107 |
| 6,319,173 B1 | * | 11/2001 | Patel | B60W 10/02 477/176 |
| 6,387,011 B1 | | 5/2002 | Bellinger | |
| 6,957,139 B2 | | 10/2005 | Bellinger | |
| 8,260,509 B2 | * | 9/2012 | Reedy | B60K 31/047 477/107 |
| 8,313,414 B2 | | 11/2012 | Kuwahara et al. | |
| 8,401,749 B2 | | 3/2013 | Ideshio et al. | |
| 2013/0173124 A1 | | 7/2013 | Palmer | |

\* cited by examiner

*Primary Examiner* — Dirk Wright
(74) *Attorney, Agent, or Firm* — Taft Stettinius & Hollister LLP (57) ABSTRACT

Apparatuses, methods and systems comprising vehicle gear shifting controls are disclosed. One embodiment is a method comprising operating a vehicle system comprising an engine structured to output torque, a transmission structured to receive torque from the engine and output torque to one or more ground contacting wheels, and an electronic control system in operative communication with the engine and the transmission. The electronic control system is structured to estimate an engine load parameter using one or more dynamically determined vehicle operating parameters, set an engine load threshold using the engine load parameter, evaluate a current engine load relative to the engine load threshold, and selectably perform an operation to control or influence a shifting event in response to the evaluation.

27 Claims, 8 Drawing Sheets

VEHICLE CONTROLS FOR DETERMINING OPTIMAL GEAR SHIFTING OPPORTUNITIES USING DYNAMICALLY DETERMINED VEHICLE PARAMETERS

BACKGROUND

The present application relates generally to vehicle controls for determining optimal gear shifting opportunities using dynamically determined vehicle parameters. Controls for vehicles including automatic transmissions typically include a shifting pattern designed to select an optimal gear using current engine load as feedback to achieve a vehicle target speed. Manual transmissions (including purely manual transmissions and automatic-manual transmissions sometimes referred to as automated-manual transmissions or AMTs) typically rely on operator decisions and judgment for gear selection. Present vehicle controls for determining optimal gear shifting opportunities suffer from a number of drawbacks, limitations and shortcomings including those respecting feedback delay, shifting frequency, and human error which may negatively impact drivability, fuel economy, and trip time. There remains a significant need for the unique and inventive apparatuses, methods, systems and controls disclosed herein.

DISCLOSURE OF ILLUSTRATIVE EMBODIMENTS

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One exemplary embodiment is a method comprising operating a vehicle system comprising an engine structured to output torque, a transmission structured to receive torque from the engine and output torque to one or more ground contacting wheels, and an electronic control system in operative communication with the engine and the transmission. The electronic control system is structured to estimate an engine load parameter using one or more dynamically determined vehicle operating parameters, set an engine load threshold using the engine load parameter, evaluate a current engine load relative to the engine load threshold, and selectably perform an operation to control or influence a shifting event in response to the evaluation. Further embodiments, forms, objects, features, advantages, aspects, and benefits shall become apparent from the following description and drawings.

DETAILED DESCRIPTION OF ILLUSTRATIVE EMBODIMENTS

Figure 1:
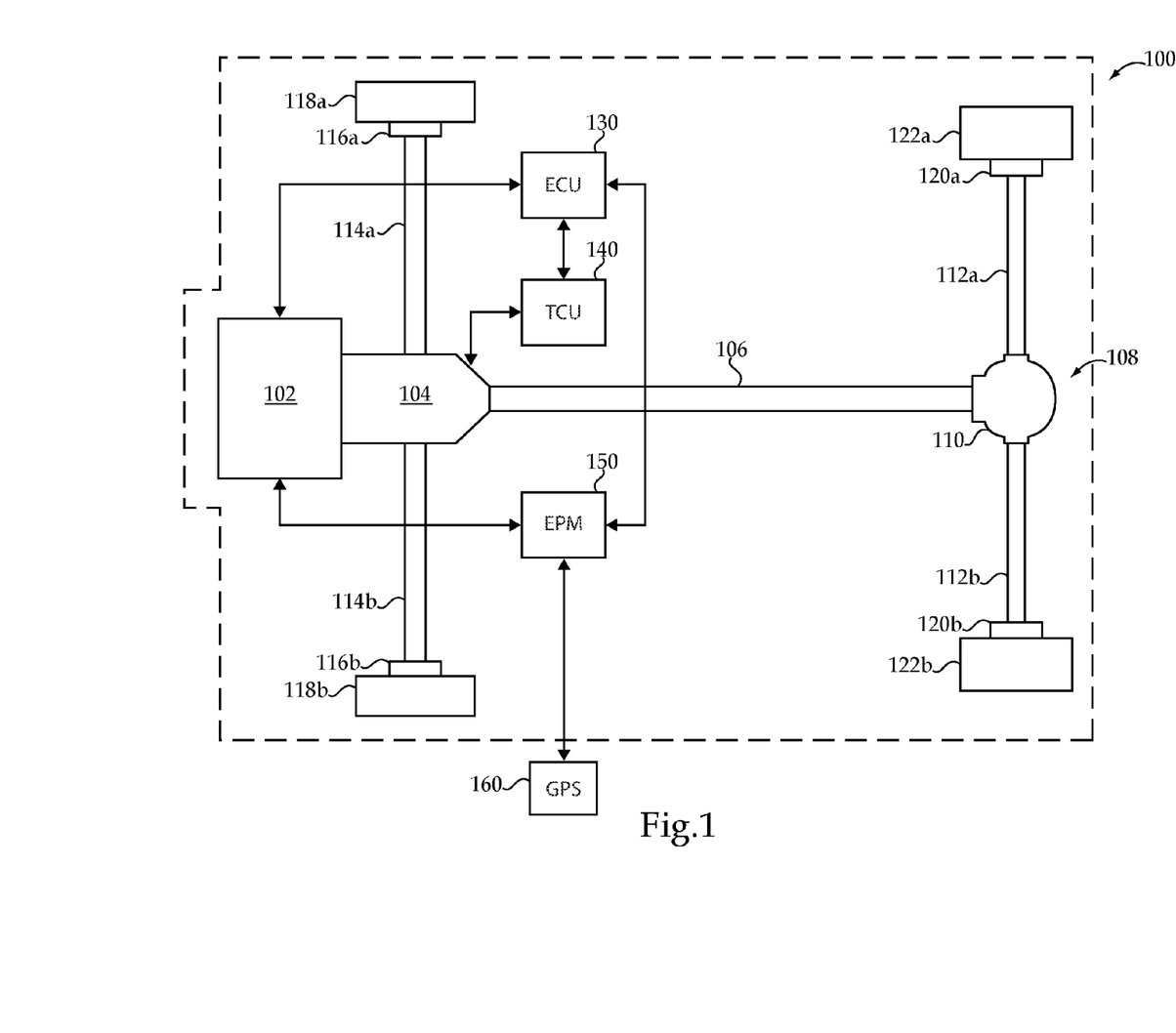
FIG. 1 is a schematic illustration of an exemplary vehicle system.

With reference to FIG. 1 there is illustrated a schematic view of an exemplary vehicle system 100 including a prime mover structured to provide motive power for the vehicle system 100. In the illustrated embodiment the prime mover is structured as an internal combustion engine 102. In other embodiments the prime mover may be structured differently, for example, as a hybrid electric prime mover including an engine and one or more electric machines or as a pneumatic hybrid prime mover including an engine and one or more pneumatic systems. It shall be understood that the description referring to engine 102 is also applicable to these and other types of prime movers. The vehicle system 100 further includes a transmission 104 operably connected to the engine 102 for receiving the output torque of the engine 102 and transmitting the output torque to a drive shaft 106. The vehicle system 100 illustrated in FIG. 1 is structured in a rear wheel drive configuration including a final drive 108 having a rear differential 110 connecting the drive shaft 106 to rear axles 112a and 112b. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle.

In the illustrated embodiment, vehicle system 100 further includes two front brakes 116a and 116b, each positioned between and operably connected to two front wheels 118a and 118b and front axles 114a and 114b, respectively. Vehicle system 100 further includes two rear brakes 120a and 120b, each positioned between two rear wheels 122a and 122b and rear axles 112a and 112b, respectively. It is contemplated that vehicle system 100 may have more or fewer tires and/or brakes than illustrated in FIG. 1. In certain embodiments, vehicle system 100 may also include various components not shown, such as a fuel system including a fuel tank, a braking system, an engine intake system, and an engine exhaust system, which may include an exhaust aftertreatment system, to name a few examples.

Vehicle system 100 includes an engine control unit (ECU) 130, sometimes referred to as an engine control module (ECM), or the like, which is directed to regulating and controlling the operation of engine 102. System 100 further includes a transmission control unit (TCU) 140 which is directed to the regulation and control of transmission 104. ECU 130 and TCU 140 are each in electrical communication with one another as well as with a plurality of sensors, actuators, and additional components of vehicle system 100 via controller area network (CAN) 155. ECU 130 and TCU 140 may be structured to receive a variety of operational information relating to vehicle system 100 including, for example, engine speed, transmission speed, engine torque, engine power, gear selection, accelerator position, brake pedal position, ambient temperature, turbocharger boost pressure, intake manifold pressure, intake manifold temperature, exhaust manifold pressure, exhaust manifold temperature, local horizon prediction information, inclinometer information, and GPS or telematics information. The foregoing information may be provided by physical sensors, virtual sensors or combinations thereof.

In certain embodiments, the ECU 130 and the TCU 140 may be combined into a single control module, commonly referred to as a powertrain control module (PCM) or powertrain control unit (PCU), or the like. It is contemplated that ECU 130 may be integrated within the engine 102 and/or TCU 140 may be integrated within transmission 104. Other various electronic control units for vehicle subsystems may be present in vehicle system 100, such as a braking system electronic control unit and a cruise control electronic control unit, for example, but such other various electronic control units for vehicle subsystems are not show in vehicle system 100 to preserve clarity.

Vehicle system 100 further includes an engine power management (EPM) controller 150 operably connected to the ECU 130 for receiving vehicle system 100 sensor data and conditions. EPM controller 150, which may be dedicated to some or all of the controls and processes disclosed in further detail below as well as to additional control for the regulation and control of the engine in vehicle system 100. In the illustrated embodiment, EPM controller 150 is in electrical communication with the ECU 130. It is contemplated that in certain embodiments EPM controller may be in electrical communication with TCU 140. In certain embodiments, a portion of the EPM controller 150 or the entire EPM controller may be integrated within the ECU 130 and/or TCU 140. EPM controller 150 may further be in electrical communication with one or more of the plurality of vehicle sensors in vehicle system 100 for receiving and transmitting conditions of vehicle system 100, such as temperature and pressure conditions, for example.

In the exemplary embodiment illustrated in FIG. 1, a navigation and positioning system 160, such as a global position system (GPS) device mounted external to vehicle system 100 and/or an electronic horizon device connected to vehicle system 100, may be electronically connected to EPM controller 150 for the purpose of providing future route grade information as well as other look ahead or forecast information. In certain embodiments, additional information from the navigation and positioning system 160 may be transmitted to the EPM controller 150, such as traffic, elevation, and/or weather conditions, for example. It is contemplated that in certain embodiments, specifically where a navigation and positioning system 160 is not connected to EPM controller 150, that route grade information may be programmed into memory and accessed by the EPM controller 150 while the vehicle is travelling along the travel route.

It is contemplated that that the controls, control systems, and control devices disclosed herein may be utilized in connection with intelligent transport systems and services (ITS) which comprises systems that integrate of information and communication technologies with transport infrastructure to improve economic performance, safety, mobility and environmental sustainability. An exemplary ITS system includes three operational layers: a data collection layer, a data aggregation and translation layer and an information dissemination layer.

The data collection layer may include EPM controller 150 and system 160 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspect, the received data may include information about road grade, speed limits, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include EPM controller 150 and system 160 as well as devices and systems on a plurality of vehicles which receive information transmitted from the data aggregation and translation layer. The received information may include road grade information, information about traffic speed over a given segment of roadway, information about speed limits, as well as information about weather conditions such as wind speed, precipitation and road conditions may be derived. As further described below, ITS information from one or more of the foregoing layers may be utilized in connection with the controls, control systems, and control devices disclosed herein.

It is contemplated that at least a portion of the conditions and/or measured inputs required for interpreting signals by the EPM controller 150 may be received from ECU 130 and/or TCU 140, in addition to or alternatively to the plurality of vehicle sensors. It is further contemplated that in certain embodiments ECU 130, TCU 140, and EPM controller 150 may transmit data communication messages across a CAN 155. ECU 130, TCU 140 and EPM 150, comprise components of an exemplary electronic control system. Various other electronic control system configurations are also contemplated.

Electronic control systems implementing the controls disclosed herein may utilize received data and signal inputs, stored data values, constants, and functions, as well as computer executable operating instructions stored on one or more non-transitory computer readable media. The control operations and processes disclosed herein may be performed at least in part by EPM 150, TCU 140, ECU 130, or combinations thereof as well as in other controllers and control units or combinations including the same. The illustrated controls and control processes are understood to be exemplary only, and operations may be combined or divided, and added or removed, as well as re-ordered in whole or part, unless stated explicitly to the contrary herein.

Certain embodiments include controls implementing engine speed controls based at least in party upon engine load estimations. The engine speed control techniques disclosed herein may be utilized to optimize fuel consumption by limiting engine speed when a vehicle does not require torque higher than an estimated torque. In certain embodiments the engine speed control techniques limit a maximum engine speed in all gears except for the top gear. In certain embodiments a higher engine speed is allowed in the second to top gear than in lower gears providing an adjusted speed delta between the second to top gear and lower gears. The engine speed control techniques disclosed herein may allow normal engine speed ranges at high loads during gear changes and in top gear.

Figure 2:
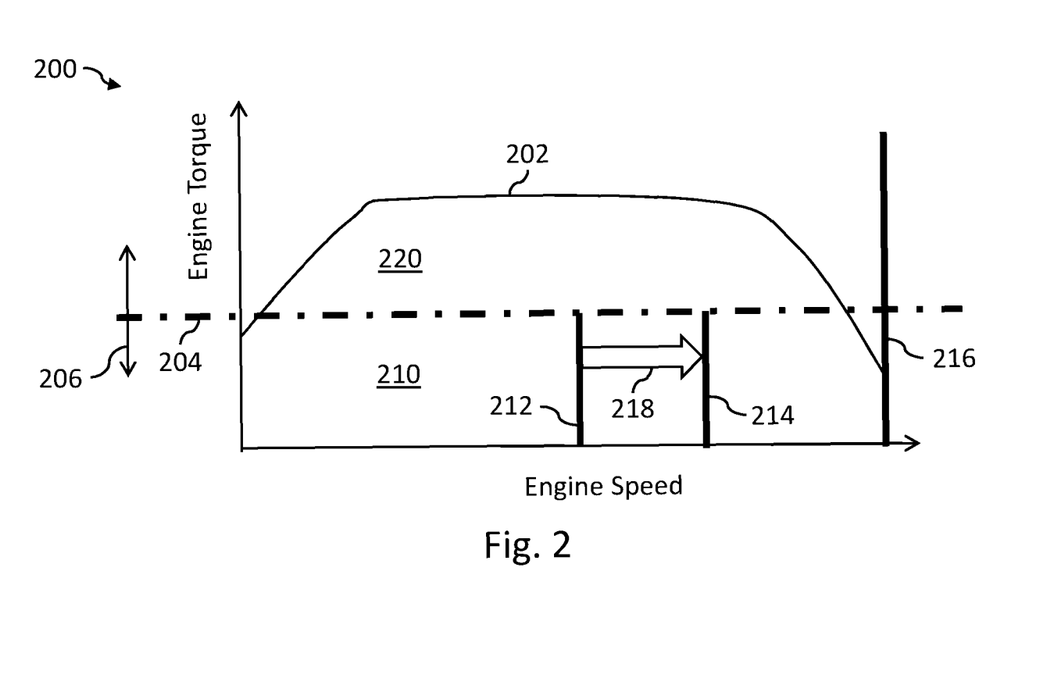
FIG. 2 is a graph illustrating certain aspects of an exemplary control technique.

With reference to FIG. 2 there is illustrated a graph 200 depicting certain aspects of an exemplary engine speed control technique. Graph 202 illustrates a torque curve 202 for an internal combustion engine and a threshold 204. It shall be appreciated that references to thresholds herein include and encompass absolute thresholds, relative thresholds, variable thresholds, as well as other criteria for comparing or judging the magnitude of one value to another. It shall be further appreciated that references herein to exceeding or a threshold include and encompass the mathematical forms of greater than and greater than or equal to and that references to not exceeding a threshold likewise include the mathematical forms of less than and less than or equal to. While the present example is discussed in terms of engine torque parameters it shall be appreciated that additional or alternate engine load parameters such as engine power may likewise be utilized.

Threshold 204 divides the area under torque curve 202 into a high load region 220 (above threshold 204) and a low load region 210 (below threshold 204). Threshold 204 may be dynamically determined during vehicle operation utilizing an estimated engine torque parameter. As indicated by arrow 206, the value of threshold 204 may vary during vehicle operation depending on the value of the estimated engine torque parameter. The estimated engine torque parameter may itself be dynamically determined using vehicle parameter determination techniques which estimate load parameters such as engine torque during vehicle operation while accounting for changing vehicle loss conditions such as road grade and aerodynamic losses. In certain embodiments, dynamic determination of vehicle properties is used to estimate engine power using a total loss parameter accounting for aerodynamic drag, rolling resistance, and powertrain losses by estimating coefficients of a polynomial function of vehicle speed. Further examples of such techniques for determining estimated engine torque parameters are disclosed in the co-pending U.S. patent application Ser. No. 14/976,717 entitled "VEHICLE CONTROLS INCLUDING DYNAMIC VEHICLE PARAMETER DETERMINATION" filed on even date herewith, the disclosure of which is hereby incorporated by reference.

Operating regions 210 and 220 may be utilized in connection with engine speed controls. When the engine is operating in region 220, engine speed limit 216 may be utilized in controlling engine speed. Limit 216 may be a default engine speed limit such as the limit provided by a high speed governor. Limit 216 may be based upon speed limits selected to protect against undesired engine function which may results in wear, damage or failure and may be a predetermined value or an adjustable value. Limit 216 may also be utilized to limit engine speed in other operating conditions such as when the transmission is in the top gear (e.g., the highest gear) irrespective of whether then engine is operating in region 210 or 220.

When the engine is operating in region 210 an evaluation of transmission gear selection may be further utilized in connection with engine speed controls. For example, when the engine is operating in region 210 and the transmission is in top gear, limit 216 may be utilized in controlling engine speed. When the engine is operating in region 210 and the transmission is in second to top gear, engine speed limit 214 may be utilized in controlling engine speed. When the engine is operating in region 210 and the transmission is in a gear lower than the second to top gear, engine speed limit 212 may be utilized in controlling engine speed. The difference between limits 212 and 214 denoted by arrow 218 may be referred to as the adjusted speed delta and may be utilized to provide certain drivability characteristics. While the present example includes two limits, 212 and 214, which are below limit 216, it shall be appreciated that other embodiments may utilize a single limit below limit 216 or may utilize more than two limits below limit 216.

The foregoing and other engine speed limits disclosed herein may comprise explicit, not-to-exceed limits on engine speed or, alternatively, may comprise engine speed breakpoints above which other limits on engine speed may be imposed. For example, engine speed breakpoints may be used to trigger a determination whether operating conditions of the vehicle justify using limit 216 or a lower limit. The lower limit may be determined, for example, using techniques such as a variable rate limiter below limit 216 or rules-based controls that impose a variable limit lower than limit 216. It shall be appreciated that references to engine speed limits herein encompass engine speed breakpoints unless indicated to the contrary.

Figure 3:
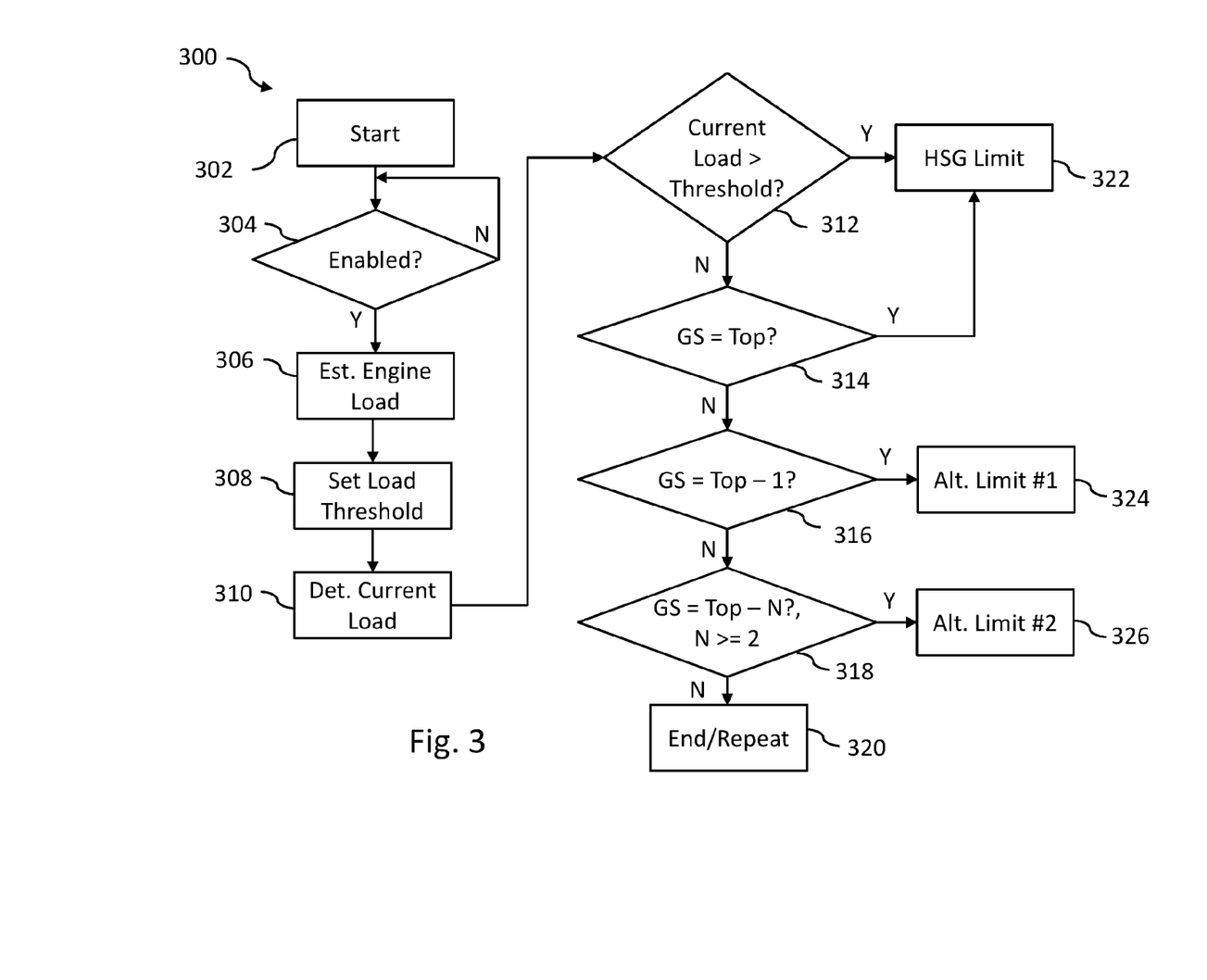
FIG. 3 is a flow diagram illustrating an exemplary control process.

With reference to FIG. 3 there is illustrated a flow diagram according to an exemplary control process 300. Process 300 may be utilized to provide controls in accordance with an engine speed control technique such as the technique illustrated and described in connection with FIG. 2 or other engine speed control techniques. Process 300 may be utilized to influence operator gear selection behavior during operation of vehicles including manual transmissions, e.g., purely manual transmissions or automatic-manual transmissions sometimes referred to as automated-manual transmissions or AMTS. Process 300 may be implemented in executable instructions stored in one or more non-transitory memory media associated with an electronic control system, such as the electronic control system described above in connection with FIG. 1 or other types of electronic control systems.

Process 300 begins at start operation 302 and proceeds to conditional 304 which evaluates whether engine speed controls are enabled. Conditional 304 may evaluate whether the transmission is out of gear, whether the transmission is shifting, whether a progressive transmission shift condition is true (i.e., whether vehicle speed is above a certain threshold, acceleration is above a certain threshold, and the gear selected is below the top gear, if the driver has selected to operate in Fuel-Economy mode), whether a power take off (PTO) state is true, and actual gear ratio to determine whether engine speed control controls are in enabled. For example, operation 304 may determine that the engine speed control controls are not enabled if the vehicle transmission is not in gear, vehicle transmission is in process of shifting, the vehicle is in a progressive transmission shift state, the vehicle PTO is active, or the vehicle is in a gear for which engine speed control controls are not desired. If conditional 304 evaluates that engine speed control are not enabled it repeats its enablement evaluation or, alternatively, process 300 may end and may be re-initiated at a later time. If conditional 304 evaluates that engine speed control controls are enabled process 300 proceeds to operation 306.

Operation 306 determines an estimated engine load. The estimated engine load parameter may be dynamically determined using vehicle parameter determination techniques which estimate engine load during vehicle operation while accounting for changing vehicle loss conditions such as road grade and aerodynamic losses. In certain embodiments, dynamic determination of vehicle properties is used to estimate engine load using a total loss parameter accounting for aerodynamic drag, rolling resistance, and powertrain losses by estimating coefficients of a polynomial function of vehicle speed. Further examples of such techniques for determining estimated engine torque parameters are disclosed in the aforementioned co-pending U.S. Patent Application which is incorporated by reference herein.

Certain embodiments may utilize learning techniques in determining estimated engine loads. For example, vehicle parameter can detect vehicle parameters from historical learning. This information can be used to adapt to different shifting patterns, optimal for different vehicles for tracking a given speed trajectory. One non-limiting example shall be described in connection with FIG. 7 which illustrates a graph 700 of engine torque vs. engine speed. Graph 700 includes a torque curve 702, constant power lines 710 and 720, operating points 712, 714, 722 and 724, and a plurality of brake specific fuel consumption (BSFC) contour lines (depicted as unnumbered dashed lines) with BSFC increasing from the inner most dashed line to the outer most dashed line. For a given drive cycle and two vehicles with same weight and different transmission ratios (referred to herein as vehicle A and vehicle B), there can be significant differences in properties between the two vehicles such as differences in aerodynamic drag, rolling resistance and powertrain related losses. These differences in properties can result in different requirements of engine power load to meet the given drive cycle speed target.

Figure 7:
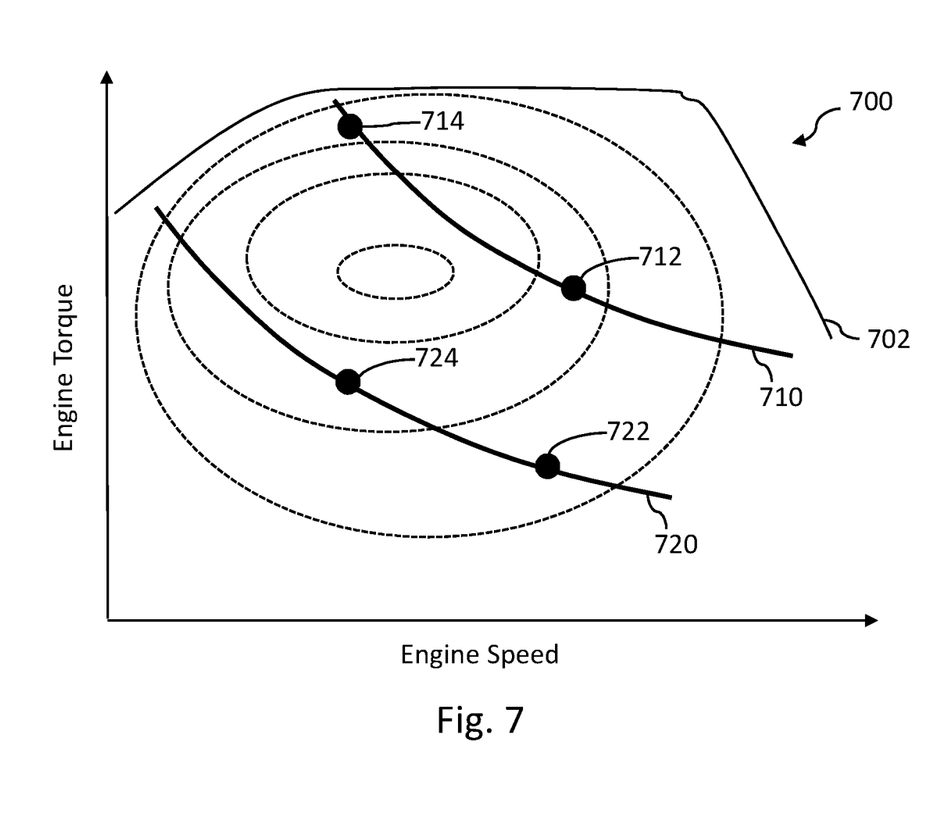

As illustrated in FIG. 7, by dynamically estimating vehicle parameters it can be estimated vehicle A has higher load requirements (indicated by constant power line 710) than the load requirements of vehicle B (indicated by constant power line 720). This information can be used to sort vehicle A and vehicle B into higher and lower categories, respectively. It shall be appreciated that sorting into more than two categories may also be utilized.

For achieving a given vehicle speed target, the engine speed and engine torque can be modulated by changing gear shifting pattern optimally ahead in time, per the specified category. An optimal gear shift pattern for vehicle A can be selected ahead in time by selection of a gear which takes engine operation to point 712 instead of point 714 due to the lower BSFC value of operating point 712 on constant power load line 710. An optimal gear shift pattern for vehicle B can be selected ahead in time by selecting a gear which takes engine operation to point 724 instead of point 722 due to the lower BSFC value of operating point 724 on constant power load line 720. The gear shift events in an optimized shifting pattern may be prompted or induced in embodiments including manual transmissions, for example by imposing a different engine speed limit or providing an operator perceptible indication, or may be commanded directly in embodiments including automatic transmissions.

Gear shift patterns such as those described above can be a pre-programmed or calibratible criteria depending upon the various categories for an application or can be optimally adjusted on-line as part of an ongoing learning process of various parameters, for example, vehicle properties, drive cycle type, driver shifting skills, and other factors. It shall be appreciated that such gear shift patterns provide a feed-forward input and modulating gear shift pattern ahead in time per vehicle specific parameter estimation. Such gear shift patterns can avoid or mitigate delays in gear shifting and frequent gear shifting which can lead to drivability issues, loss in trip time and greater fuel consumption.

From operation 306 process 300 proceeds to operation 308 which sets an engine load threshold. The engine load threshold may be set utilizing the estimated engine load determined in operation 304. In certain embodiments the engine load threshold may set to the value of the estimated engine load. In some embodiments the engine load threshold may be set utilizing the maximum of a predetermined calibration load threshold and the estimated engine load. In some embodiments the engine load threshold may be set by modifying the value of the estimated engine load, for example, with one or more weighting coefficients or functions.

From operation 308 process 300 proceeds to operation 310 which determines a current engine load. Current engine load may be determined using a number of techniques, for example, using output from a torque sensor, using accelerator to torque tables or other estimation or correlation techniques, or using fueling to torque tables or other estimation or correlation techniques, among other techniques. It shall be appreciated that current engine load is a distinct parameter from estimated engine load and may differ from estimated engine load based upon differences in the technique utilized for determination or estimation of these distinct parameters, differences in the time of determination or estimation, and/or differences in time frame to which the determination or estimation relates, such as current versus future times. It shall be further appreciated that the distinct nature of these two parameters allows for comparisons and evaluations therebetween.

From operation 310 process 300 proceeds to conditional 312 which evaluates whether a current engine load exceeds the engine load threshold. If conditional 312 evaluates that the current engine load exceeds the engine load threshold process 300 proceeds to operation 322 which utilizes an engine high speed governor parameter to limit engine speed. If conditional 312 evaluates that the current load does not exceed the threshold process 300 proceeds to conditional 314 which evaluates whether the transmission gear state is in the top gear. If conditional 314 evaluates that the gear state is in the top gear process 300 proceeds to operation 322. If conditional 314 evaluates that the gear state is not in the top gear, process 300 proceeds to conditional 316.

Conditional 316 evaluates whether the transmission gear state is in the second to top gear. If conditional 316 evaluates that the gear state is in the second to top gear, process 300 proceeds to operation 324 which imposes an alternate limit on engine speed. The alternate limit imposed by operation 324 may be configured for the second to top gear and may be, for example, limit 214 described in connection with FIG. 2. If conditional 316 evaluates that the gear state is not in the second to top gear, process 300 proceeds to operation 318.

Operation 318 evaluates whether transmission gear state is in a gear lower than the second to top gear. If conditional 318 evaluates that the gear state is in a gear lower than the second to top gear, process 300 proceeds to operation 326 which utilizes another alternate engine speed limit 326 in controlling engine speed. Limit 326 may be configured for gears lower than the second to top gear and may be, for example, limit 212 described above in connection with FIG. 2. If operation 318 evaluates that the gear state is not in a gear lower than the second to top gear, process 300 proceeds to operation 320 which ends process 300 or repeats process 300 from start operation 302.

Figure 4:
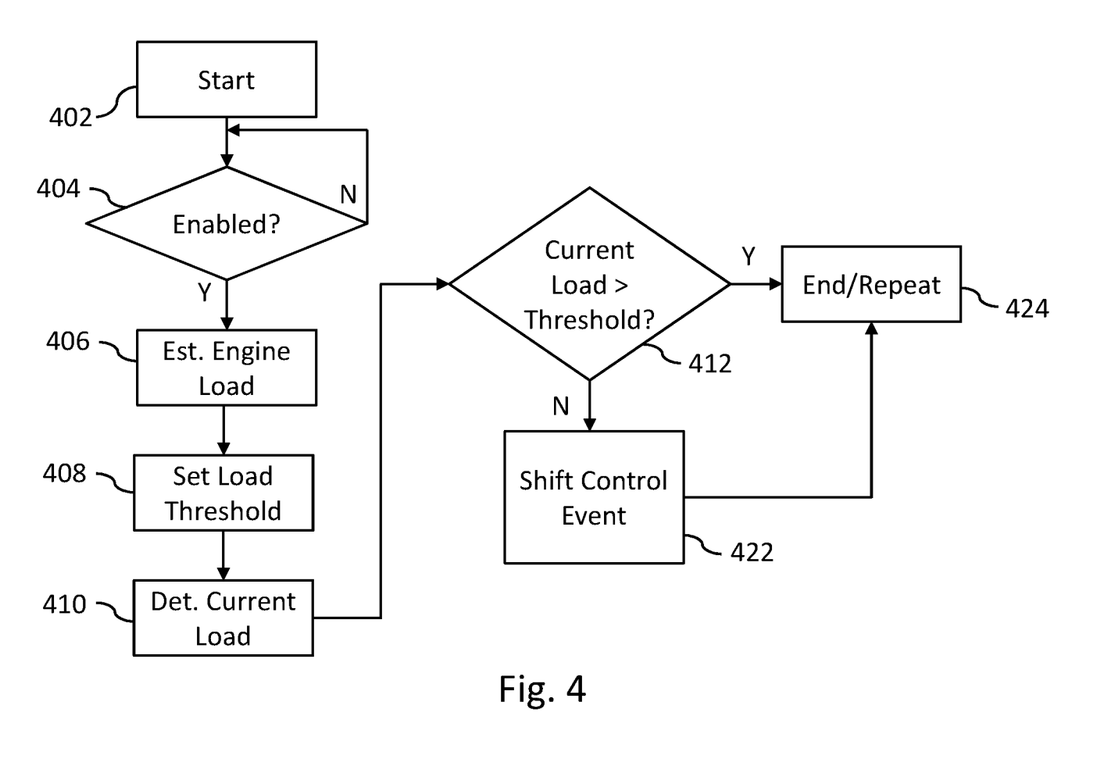
FIG. 4 is a flow diagram illustrating an exemplary control process.

With reference to FIG. 4 there is illustrated a flow diagram of an exemplary control process 400. Process 400 may be utilized to provide controls for gear shift events in vehicles utilizing automatic transmissions, or to prompt or influence operator gear selection behavior during operation of vehicles including manual transmissions. Process 400 may be implemented in executable instructions stored in one or more non-transitory memory media associated with an electronic control system, such as the electronic control system described above in connection with FIG. 1 or other types of electronic control systems.

Process 400 begins at start operation 402 and proceeds to conditional 404 which evaluates whether the controls of process 400 are enabled. Conditional 404 may evaluate criteria such as those described in connection with operation 302 of FIG. 3. If conditional 404 evaluates that the controls are not enabled it repeats. If conditional 404 evaluates that the controls are enabled it proceeds to operation 406 which determines an estimated engine load. Operation 406 may determine the estimated engine load using techniques such as those described above in connection with operation 306 of FIG. 3.

From operation 406 process 400 proceeds to operation 408 which sets an engine load threshold. The engine load threshold may be set utilizing the estimated engine load determined in operation 404, for example, using the techniques described in connection with operation 308 of FIG. 3. From operation 408 process 400 proceeds to operation 410 which determines a current engine load, for example, using the techniques described in connection with operation 310 of FIG. 3.

From operation 410 process 400 proceeds to conditional 412 which evaluates whether a current engine load exceeds the engine load threshold. If conditional 412 evaluates that the current engine load exceeds the engine load threshold process 400 proceeds to operation 424 which ends process 400 or repeats process 400 from start operation 402. If conditional 412 evaluates that the current engine load does not exceed the engine load threshold process 400 proceeds to operation 422 which executes a command for a shift control event. In certain embodiments including automatic transmissions to command for a shift control event may be a command to shift an automatic transmission. In certain embodiments including manual transmissions the command for a shift control event may be a command structured to influence operator shifting behavior, for example, imposition of an engine speed limit and/or actuation of one or more operator perceptible shift indicators, such as a visual or audible shift indicator. In certain embodiments if conditional 412 evaluates that the current engine load exceeds the engine load threshold operation 424 may execute a command for an alternate shift control event.

Figure 5:
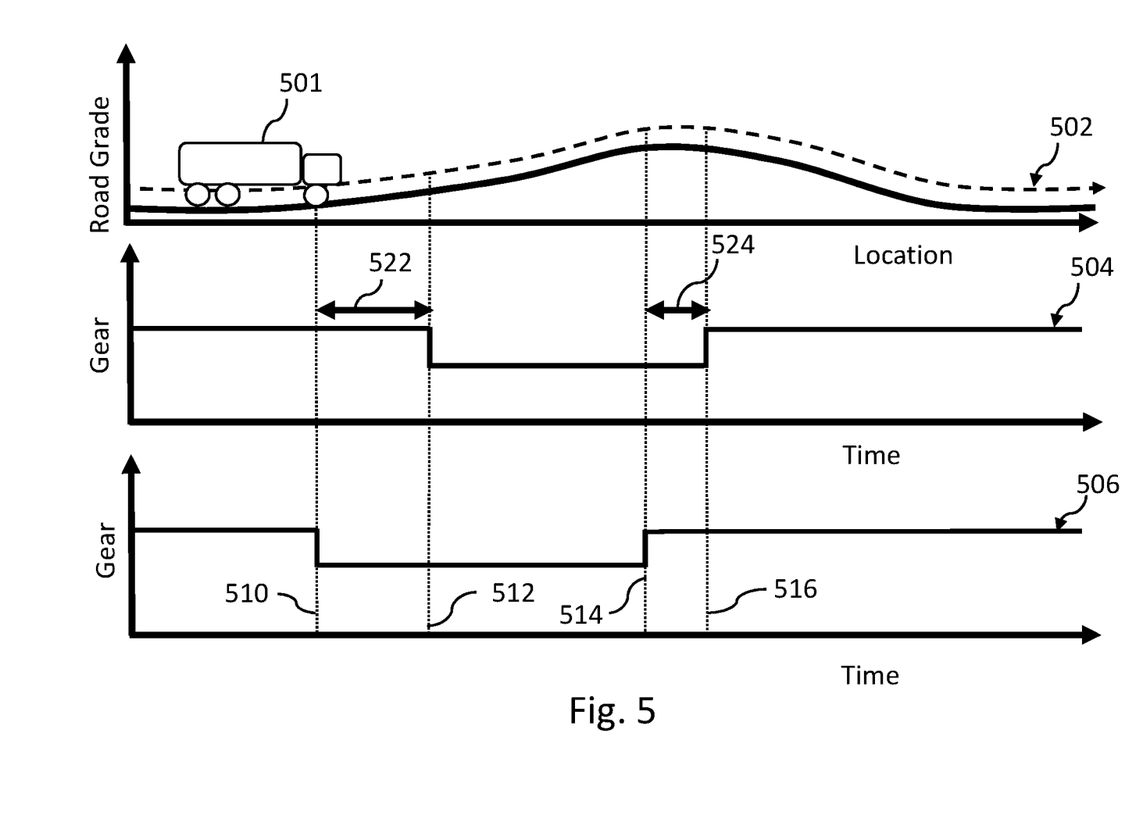
FIGS. 5-8 are graphs illustrating certain aspects of exemplary controls.

With reference to FIG. 5, there is illustrated a set of graphs depicting certain aspects of exemplary controls relative to operator behavior. The top graph of FIG. 5 illustrates variation in road grade as a function of location which is encountered by a vehicle 501 traveling along a route 502. In the illustrated embodiment route 502 includes a hill approach, ascent, crest and descent. It shall be appreciated that the illustration of variation in road grade is but one example of a variation in vehicle operating conditions with which the controls disclosed herein may be utilized. Further examples include variation in traffic speed, wind resistance, vehicle speed, speed limit, vehicle mass, vehicle acceleration, or combinations of these and/or other variation in vehicle operating conditions.

The middle graph of FIG. 5 illustrates variation in gear selection (indicated by step changes in line 504) as a function of time for vehicle 501 traveling along route 502 without the use of controls utilizing look-ahead information. From the illustrated starting location of vehicle 501, the operator has selected a gear desired for the load experienced during travel at given a speed along terrain of a generally constant grade. At the time and location indicated by line 510 the vehicle begins to climb a hill, however, the operator maintains the initial gear selection until a later point in time/location indicated by line 512 at which the operator perceives and reacts to a change in vehicle performance associated with a change in road grade, e.g., a loss of speed from selection of a gear that is too high. In response the operator selects a lower gear (though perhaps not an optimal gear), continues to climb the hill and crests the hill. The operator maintains the lower gear selected for climbing the hill until a later point in time/location indicated by line 516 at which the operator perceives and reacts to a change in vehicle performance, e.g., an increase of engine speed inducing an up shift gear selection.

The lower graph of FIG. 5 illustrates variation in gear selection (indicated by step changes in line 506) as a function of time for vehicle 501 traveling along route 502 with the use of controls utilizing look-ahead information. From the illustrated starting location of vehicle 501, the operator has selected the same initial gear as in the middle graph. At the time and location indicated by line 510 the vehicle begins to climb a hill, and has also received look-ahead information indicating that the start of an increase in road grade. The look-ahead information may be received from a source internal to the vehicle such as an on-vehicle model including a look-ahead time horizon or from a source external from the vehicle such as a GPS system and/or an ITS system as described above in connection with FIG. 1 and may be utilized in predicting a future engine load parameter. In embodiments utilizing an automatic transmission, at the point at which an increased future engine load has been predicted the controls may function to command a gear shift event in advance of the predicted future engine load change. In embodiments utilizing a manual transmission the controls may provide an indication to the operator to down shift gears or to shift to a particular gear, e.g., a visual and/or audible shift indicator. Such an indication may also be provided in advance of the predicted future engine load change.

Look-ahead information may also be used to control or induce gear changes in advance of hill descent. At the time and location indicated by line 514 the vehicle begins to crest a hill, and has also received look-ahead information indicating that the start of a decrease in road grade which may be utilized to determine a future estimated engine load. At this point in embodiments utilizing an automatic transmission, the controls may function to command an up shift event in advance of the predicted future engine load change. In embodiments utilizing a manual transmission the controls may provide an indication to the operator to up shift gears or to shift to a particular gear or may impose an alternate speed limit on the engine to induce a down shift by the operator, e.g., a limit such as limit 212 or 214 described in connection with FIG. 2.

Arrow 522 indicates the difference between gear shift events at lines 510 in the lower graph and 512 in the middle graph. This difference can lead to loss of power during in-climb shifting events, increase in trip time, greater fuel consumption and increased loads on the engine and powertrain. Arrow 524 indicates the difference between gear shift events at lines 514 in the lower graph and 516 in the middle graph. This difference can lead to an increase in trip time and greater fuel consumption. To avoid these and other disadvantages, estimates of future engine load can be used with an optimal gear selection controls to find optimal gear for future operating conditions. Optimal gears can be identified with optimizations accounting for various factors, for example, fuel consumption criteria, engine brake thermal efficiency (BTE) maps, emissions criteria, drivability criteria, trip time criteria, or combinations of these criteria and/or other criteria.

Figure 6:
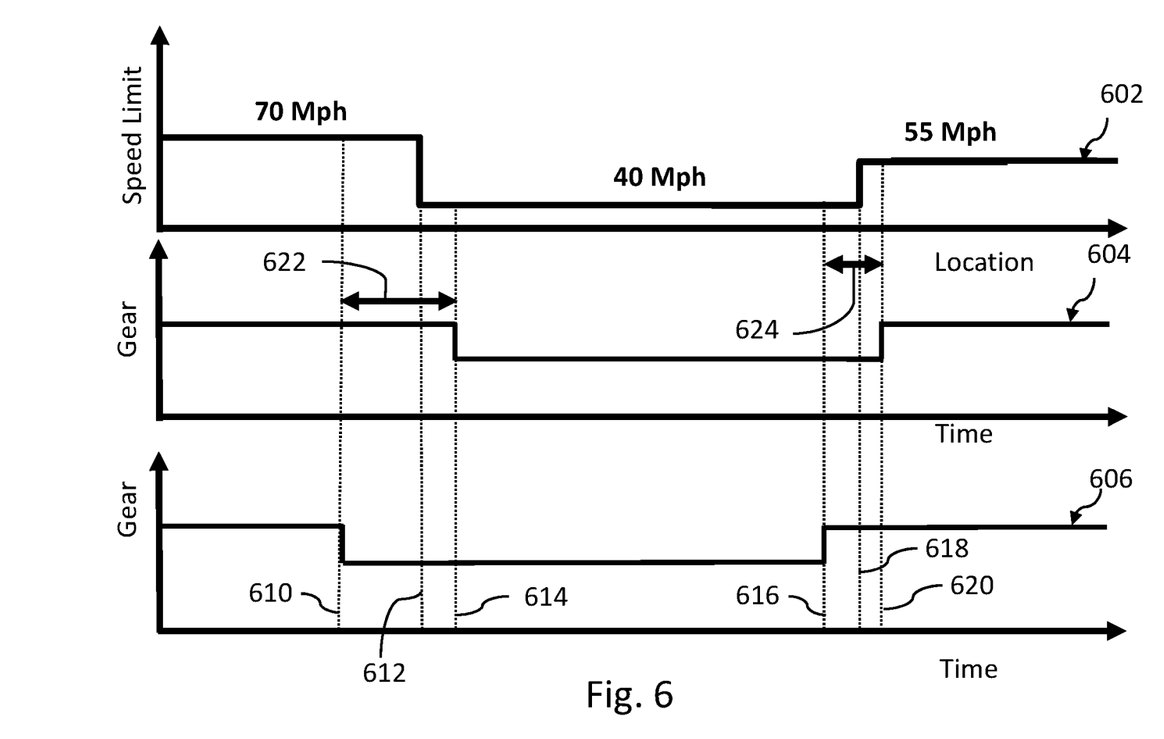

With reference to FIG. 6, there is illustrated a set of graphs depicting certain aspects of exemplary controls relative to operator behavior. The top graph of FIG. 6 illustrates variation in speed limit as a function of location which is encountered by a vehicle traveling along a route. It shall be appreciated that the illustration of variation in speed limit is but one example of a variation in vehicle operating conditions with which the controls disclosed herein may be utilized. Further examples include those described above in connection with FIG. 5.

The middle graph of FIG. 6 illustrates variation in gear selection (indicated by step changes in line 604) as a function of time for the vehicle traveling along the route without the use of controls utilizing look-ahead information. From the starting location of the middle graph, the operator has selected a gear desired for the load experienced during travel as at given a speed consistent with a current speed limit of 70 mph. At the time and location indicated by line 612 the speed limit decreases to 40 mph. At the time and location indicated by line 614 the operator reacts to the decreased speed limit by changing a gear selection to a lower gear. At the time and location indicated by line 618 the speed limit increases to 55 mph. In response at the time and location indicated by line 620, the operator selects a higher gear.

The lower graph of FIG. 6 illustrates variation in gear selection (indicated by step changes in line 606) as a function of time for the vehicle traveling along the route with the use of controls utilizing look-ahead information. From the illustrated starting location of the lower graph, the operator has selected the same initial gear desired. At the time and location indicated by line 610 the vehicle approaches a speed limit change, and has also received look-ahead information indicating the same. The look-ahead information may be received from a source external to the vehicle such as an ITS system as described above in connection with FIG. 1 and may be utilized in predicting a future engine load parameter. In embodiments utilizing an automatic transmission, at the point at which an increased future engine load has been predicted the controls may function to command a gear shift event. In embodiments utilizing a manual transmission the controls may provide an indication to the operator to down shift gears or to shift to a particular gear or may impose an alternate speed limit on the engine to induce a down shift by the operator, e.g., a temporary increase in the high speed governor speed limit.

Look-ahead information may also be used to control or induce gear changes in anticipation of an increase speed limit. At the time and location indicated by line 616 the vehicle is approaching such an increase, and has also received look-ahead information indicating the same. This information may be utilized to determine an increase in future estimated engine load. At this point in embodiments utilizing an automatic transmission, the controls may function to command an up shift event. In embodiments utilizing a manual transmission the controls may provide an indication to the operator to up shift gears or to shift to a particular gear or may impose an alternate speed limit on the engine to induce a down shift by the operator, e.g., a limit such as limit 212 or 214 described in connection with FIG. 2.

Arrow 622 indicates the difference between gear shift events at lines 610 in the lower graph and 612 in the middle graph. This difference can lead to increase in trip time, greater fuel consumption and increased loads on the engine and powertrain. Arrow 624 indicates the difference between gear shift events at lines 616 in the lower graph and 620 in the middle graph. This difference can also lead to an increase in trip time and greater fuel consumption. To avoid these and other disadvantages, estimates of future engine load can be used with an optimal gear selection controls to find optimal gear for future operating conditions. Optimal gears can be identified with optimizations accounting for various factors, for example, fuel consumption criteria, engine brake thermal efficiency (BTE) maps, emissions criteria, drivability criteria, trip time criteria, or combinations of these criteria and/or other criteria.

Figure 8:
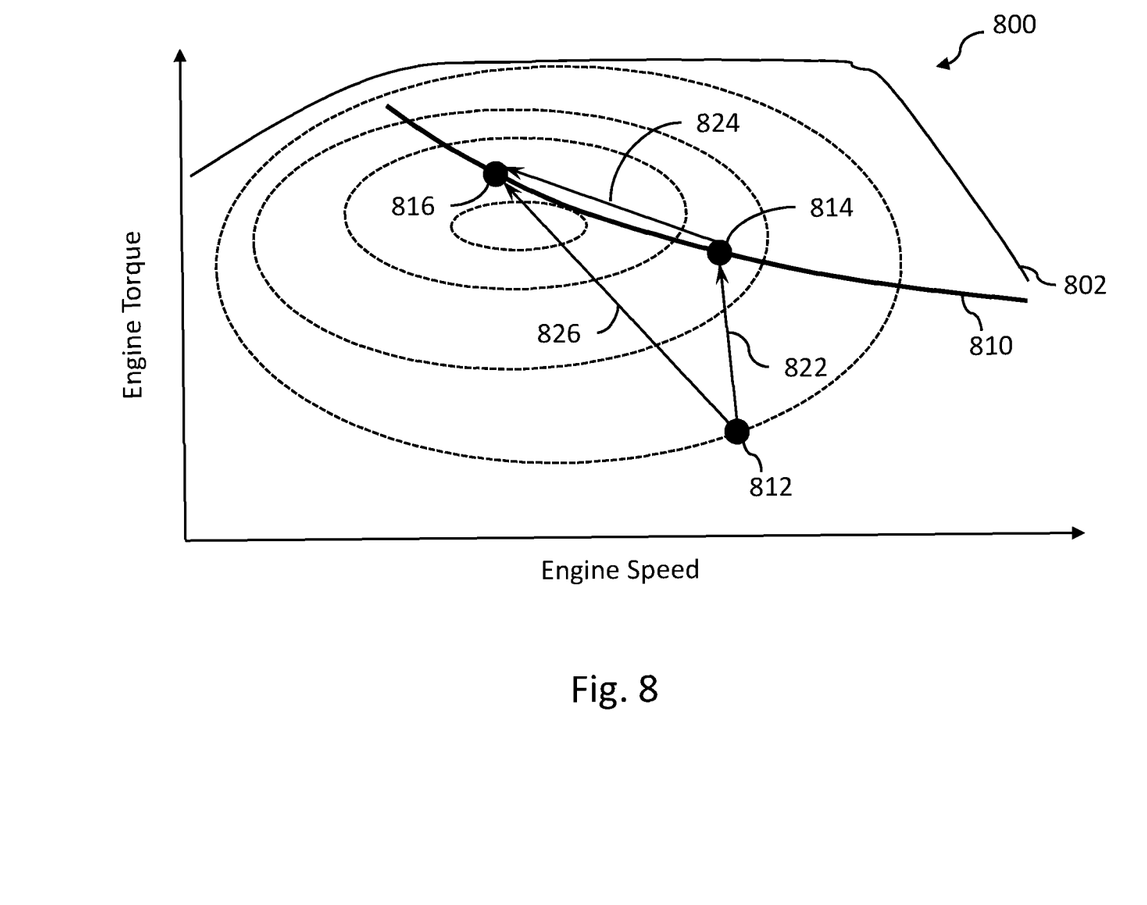

FIG. 8 illustrates a further example of controls utilizing look-ahead information to control or induce gear changes in anticipation in advance of predicted future changes in engine load. FIG. 8 which illustrates a graph 800 of engine torque vs. engine speed. Graph 800 includes a torque curve 802, a constant power line 810, operating points 812, 814, and 816, and a plurality of brake specific fuel consumption (BSFC) contour lines (depicted as unnumbered dashed lines) with BSFC increasing from the inner most dashed line to the outer most dashed line. In the absence of controls utilizing look ahead information to predict future engine load, an operator or a reactive electronic shifting controller may initially shift gears to take the engine from operating point 812 to operating point 814 in reaction to an engine load increase, e.g., by down shifting by a first number of gears. The driver or controller may later again shift gears to take the engine from operating point 814 to operating point 816 in a further reaction to the engine load increase, e.g., by down shifting an additional number of gears. By following the shift pattern denoted by arrows 822 and 824, the vehicle will experience multiple shift events and incur operation at point 814 which includes greater fuel consumption than operating at point 824.

Controls which utilize look ahead information to predict future engine loads can identify a future optimal operating point such as point 816 and associated gear selection providing such operation in advance of the vehicle encountering conditions which produce a changed future engine load. Thus, gear shifting can thus occur in advance of a changed load condition, for example, by a shifting event from point 812 directly to point 816 as denoted by arrow 826. This avoids multiple shifts and mitigates operation at higher BSFC operating points.

The gear shift events in an optimized shifting pattern such as described above may be prompted or induced in embodiments including manual transmissions, for example by imposing a different engine speed limit or providing an operator perceptible indication, or may be commanded directly in embodiments including automatic transmissions. A variety of types of look ahead information may be utilized in predicting future engine loads including, Such information may include information from an on-vehicle source such as a look-ahead horizon provided in a controller as well as information from a source external to the vehicle such as a GPS system or ITS system. The particular types of information may be utilized in determining future engine load may include, for example, future road grade information, a future limits on vehicle speed, future vehicle acceleration information, future speed limit information, future traffic speed information, and a future traffic signal information, future aerodynamic resistance and future vehicle mass.

A number of further exemplary embodiments shall now be described. One embodiment is a method comprising: operating a vehicle system comprising an engine structured to output torque, a manual transmission structured to receive torque from the engine and output torque to one or more ground contacting members, and an electronic control system in operative communication with the engine and the transmission, the electronic control system being structured to perform the acts of: estimating an engine load parameter using one or more dynamically determined vehicle operating parameters, setting an engine load threshold using one of the estimated engine load parameter and a predetermined calibratible value, evaluating a current engine load relative to the engine load threshold, evaluating an operator gear selection condition of the transmission, if either the current engine load parameter exceeds the threshold or the operator gear selection is a top gear selection, imposing a first operating speed limit on the engine, and if the current engine load parameter does not exceed the threshold and the operator gear selection is not a top gear selection, imposing an alternate operating speed limit on the engine, the alternate operating speed limit being lower than the first operating speed limit.

In certain forms of the foregoing embodiment, if the current engine load parameter does not exceed the threshold and the operator gear selection is a second-to-top gear selection, imposing and a second operating speed limit on the engine as the alternate operating speed limit, and if the current engine load parameter does not exceed the threshold and the operator gear selection is lower than the second-to-top gear selection, imposing and a third operating speed limit as the alternate operating speed limit, the third operating speed limit being less than the second operating speed limit. In certain forms the engine load threshold changes dynamically with changes in the estimated engine load parameter. In certain forms the estimated engine load parameter is an estimated future engine load parameter. In certain forms the estimated future engine load parameter accounts for one or more of a future road grade, a future limit on vehicle speed, a future vehicle acceleration, a future speed limit, a future traffic speed information, and a future traffic signal information. In certain forms the estimated future engine load parameter is determined utilizing information received from an intelligent transportation system external to the vehicle. In certain forms the information from the intelligent transportation system comprises one or more of speed limit information, traffic speed information, traffic signal information, road grade information, vehicle speed information, and vehicle acceleration information. In certain forms the act of setting an engine load threshold utilizes the greater of the estimated engine load parameter and the predetermined calibratible value such that the predetermined calibratible value provides a minimum value for the threshold.

Another embodiment is a vehicle system comprising: an engine structured to output torque; a transmission structured to receive torque from the engine and output torque to one or more ground contacting members; and an electronic control system in operative communication with the engine and the transmission; wherein the electronic control system is structured to perform the acts of: estimating an engine load parameter using one or more dynamically determined vehicle operating parameters, setting an engine load threshold using the estimated engine load parameter, evaluating a current engine load relative to the engine load threshold, evaluating a gear selection condition of the transmission, if either the current engine load parameter exceeds the threshold or the gear selection is a top gear selection, imposing a first operating speed limit on the engine, and if the current engine load parameter does not exceed the threshold and the gear selection is not a top gear selection, imposing an alternate operating speed limit on the engine, the alternate operating speed limit being lower than the first operating speed limit.

In certain forms of the foregoing embodiment the alternate operating speed limit varies for different gear selections below the top gear. In certain forms the engine load threshold changes dynamically as a function of the engine load parameter. In certain forms the estimated engine load parameter is an estimated future engine load parameter. In certain forms the estimated future engine load parameter accounts for one or more of a future road grade, a future limit on vehicle speed, a future vehicle acceleration, a future speed limit, a future traffic speed information, and a future traffic signal information. In certain forms the estimated future engine load parameter is determined utilizing information transmitted to the vehicle from system external to the vehicle. In certain forms information transmitted to the vehicle from system external to the vehicle comprises one of information transmitted via ground-to-vehicle communication system and information transmitted via a vehicle-to-vehicle communication system.

A further embodiment is a method comprising: operating a vehicle system comprising an engine structured to output torque, a transmission structured to receive torque from the engine and output torque to one or more ground engaging members, and an electronic control system in operative communication with the engine and the transmission, the electronic control system being structured to perform the acts of: estimating a future engine load parameter using one or more dynamically determined vehicle operating parameters, setting an engine load threshold using the engine load parameter, evaluating a current engine load relative to the engine load threshold, and outputting a command to induce a transmission gear shift based upon the result of the evaluating.

In certain forms of the foregoing embodiment the transmission is a manual transmission and the command to induce a transmission gear shift comprises one of a limit on engine speed that is below a high speed governor limit on engine speed and an operator perceptible indication to shift gears. In certain forms the transmission is an automatic transmission and the command to induce a transmission gear shift comprises a command to the automatic transmission to shift gears. In certain forms wherein the estimated future engine load parameter accounts for one or more of a future road grade, a future limit on vehicle speed, a future speed limit, and a future vehicle acceleration. In certain forms the estimated future engine load parameter is determined utilizing information received from a system external to the vehicle. In certain forms the received information comprises one or more of road grade information, vehicle speed information, vehicle acceleration information, speed limit information, traffic speed information, and traffic signal information. In certain forms the command comprises an upshift command if the current engine load exceeds the threshold and comprises a downshift command if the current engine load does not exceed the threshold.

Another embodiment is a method comprising: an engine structured to output torque; a transmission structured to receive torque from the engine and output torque to one or more ground engaging members; and an electronic control system in operative communication with the engine and the transmission, the electronic control system being structured to perform the acts of: estimating an engine load parameter using one or more dynamically determined vehicle operating parameters, the dynamically determined vehicle operating parameters accounting for variation in vehicle-specific losses experienced during prior vehicle operation, determining a feedforward transmission shifting parameter using the estimated engine load parameter, and outputting a command to induce a transmission gear shift using the feedforward shifting parameter, the command being structured to induce a transmission shifting event accounting for the dynamically determined vehicle operating parameters.

In certain forms of the foregoing embodiment the transmission is a manual transmission and the command to induce a transmission gear shift comprises one of a limit on engine speed that is below a high speed governor limit on engine speed and an operator perceptible indication to shift gears. In certain forms the transmission is an automatic transmission and the command to induce a transmission gear shift comprises a command to the automatic transmission to shift gears. In certain forms the feedforward transmission shifting comprises a modification to a transmission shifting command pattern. In certain forms the feedforward transmission shifting comprises selection of one of a plurality of predetermined transmission shifting command patterns.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
    operating a vehicle system comprising an engine structured to output torque, a manual transmission structured to receive torque from the engine and output torque to one or more ground contacting members, and an electronic control system in operative communication with the engine and the transmission, the electronic control system being structured to perform the acts of:
    estimating an engine load parameter using one or more dynamically determined vehicle operating parameters,
    setting an engine load threshold using one of the estimated engine load parameter and a predetermined calibratible value,
    evaluating a current engine load relative to the engine load threshold,
    evaluating an operator gear selection condition of the transmission,
    if either the current engine load parameter exceeds the threshold or the operator gear selection is a top gear selection, imposing a first operating speed limit on the engine, and
    if the current engine load parameter does not exceed the threshold and the operator gear selection is not a top gear selection, imposing an alternate operating speed limit on the engine, the alternate operating speed limit being lower than the first operating speed limit.

2. The method of claim 1 wherein
    if the current engine load parameter does not exceed the threshold and the operator gear selection is a second-to-top gear selection, imposing and a second operating speed limit on the engine as the alternate operating speed limit, and
    if the current engine load parameter does not exceed the threshold and the operator gear selection is lower than the second-to-top gear selection, imposing and a third operating speed limit as the alternate operating speed limit, the third operating speed limit being less than the second operating speed limit.

3. The method of claim 1 wherein the engine load threshold changes dynamically with changes in the estimated engine load parameter.

4. The method of claim 1 wherein the estimated engine load parameter is an estimated future engine load parameter.

5. The method of claim 4 wherein the estimated future engine load parameter accounts for one or more of a future road grade, a future limit on vehicle speed, a future vehicle acceleration, a future speed limit, a future traffic speed information, and a future traffic signal information.

6. The method of claim 4 wherein the estimated future engine load parameter is determined utilizing information received from an intelligent transportation system external to the vehicle.

7. The method of claim 6 wherein the information from the intelligent transportation system comprises one or more of speed limit information, traffic speed information, traffic signal information, road grade information, vehicle speed information, and vehicle acceleration information.

8. The method of claim 1 wherein the act of setting an engine load threshold utilizes the greater of the estimated engine load parameter and the predetermined calibratible value such that the predetermined calibratible value provides a minimum value for the threshold.

9. A vehicle system comprising:
    an engine structured to output torque;
    a transmission structured to receive torque from the engine and output torque to one or more ground contacting members; and
    an electronic control system in operative communication with the engine and the transmission;
    wherein the electronic control system is structured to perform the acts of:
    estimating an engine load parameter using one or more dynamically determined vehicle operating parameters,
    setting an engine load threshold using the estimated engine load parameter,
    evaluating a current engine load relative to the engine load threshold,
    evaluating a gear selection condition of the transmission,
    if either the current engine load parameter exceeds the threshold or the gear selection is a top gear selection, imposing a first operating speed limit on the engine, and
    if the current engine load parameter does not exceed the threshold and the gear selection is not a top gear selection, imposing an alternate operating speed limit on the engine, the alternate operating speed limit being lower than the first operating speed limit.

10. The vehicle system of claim 9 wherein the alternate operating speed limit varies for different gear selections below the top gear.

11. The vehicle system of claim 9 wherein the engine load threshold changes dynamically as a function of the engine load parameter.

12. The vehicle system of claim 9 wherein the estimated engine load parameter is an estimated future engine load parameter.

13. The vehicle system of claim 12 wherein the estimated future engine load parameter accounts for one or more of a future road grade, a future limit on vehicle speed, a future vehicle acceleration, a future speed limit, a future traffic speed information, and a future traffic signal information.

14. The vehicle system of claim 12 wherein the estimated future engine load parameter is determined utilizing information transmitted to the vehicle from system external to the vehicle.

15. The vehicle system of claim 12 wherein information transmitted to the vehicle from system external to the vehicle comprises one of information transmitted via ground-to-vehicle communication system and information transmitted via a vehicle-to-vehicle communication system.

16. A method comprising:
operating a vehicle system comprising an engine structured to output torque, a transmission structured to receive torque from the engine and output torque to one or more ground engaging members, and an electronic control system in operative communication with the engine and the transmission, the electronic control system being structured to perform the acts of:
estimating a future engine load parameter using one or more dynamically determined vehicle operating parameters,
setting an engine load threshold using the engine load parameter,
evaluating a current engine load relative to the engine load threshold, and
outputting a command to induce a transmission gear shift based upon the result of the evaluating.

17. The method of claim 16 wherein the transmission is a manual transmission and the command to induce a transmission gear shift comprises one of a limit on engine speed that is below a high speed governor limit on engine speed and an operator perceptible indication to shift gears.

18. The method of claim 16 wherein the transmission is an automatic transmission and the command to induce a transmission gear shift comprises a command to the automatic transmission to shift gears.

19. The method of claim 16 wherein the estimated future engine load parameter accounts for one or more of a future road grade, a future limit on vehicle speed, a future speed limit, and a future vehicle acceleration.

20. The method of claim 16 wherein the estimated future engine load parameter is determined utilizing information received from a system external to the vehicle.

21. The method of claim 20 wherein the received information comprises one or more of road grade information, vehicle speed information, vehicle acceleration information, speed limit information, traffic speed information, and traffic signal information.

22. The method of claim 16 wherein the command comprises an upshift command if the current engine load exceeds the threshold and comprises a downshift command if the current engine load does not exceed the threshold.

23. A vehicle system comprising:
an engine structured to output torque;
a transmission structured to receive torque from the engine and output torque to one or more ground engaging members; and
an electronic control system in operative communication with the engine and the transmission, the electronic control system being structured to perform the acts of:
estimating an engine load parameter using one or more dynamically determined vehicle operating parameters, the dynamically determined vehicle operating parameters accounting for variation in vehicle-specific losses experienced during prior vehicle operation,
determining a feedforward transmission shifting parameter using the estimated engine load parameter, and
outputting a command to induce a transmission gear shift using the feedforward shifting parameter, the command being structured to induce a transmission shifting event accounting for the dynamically determined vehicle operating parameters.

24. The vehicle system of claim 23 wherein the transmission is a manual transmission and the command to induce a transmission gear shift comprises one of a limit on engine speed that is below a high speed governor limit on engine speed and an operator perceptible indication to shift gears.

25. The vehicle system of claim 23 wherein the transmission is an automatic transmission and the command to induce a transmission gear shift comprises a command to the automatic transmission to shift gears.

26. The vehicle system of claim 23 wherein the feedforward transmission shifting comprises a modification to a transmission shifting command pattern.

27. The vehicle system of claim 23 wherein the feedforward transmission shifting comprises selection of one of a plurality of predetermined transmission shifting command patterns.

* * * * *